G. L. STRUBLER.
PARCEL POST SCALE.
APPLICATION FILED AUG. 11, 1917.
1,296,710.
Patented Mar. 11, 1919.
5 SHEETS—SHEET 3.
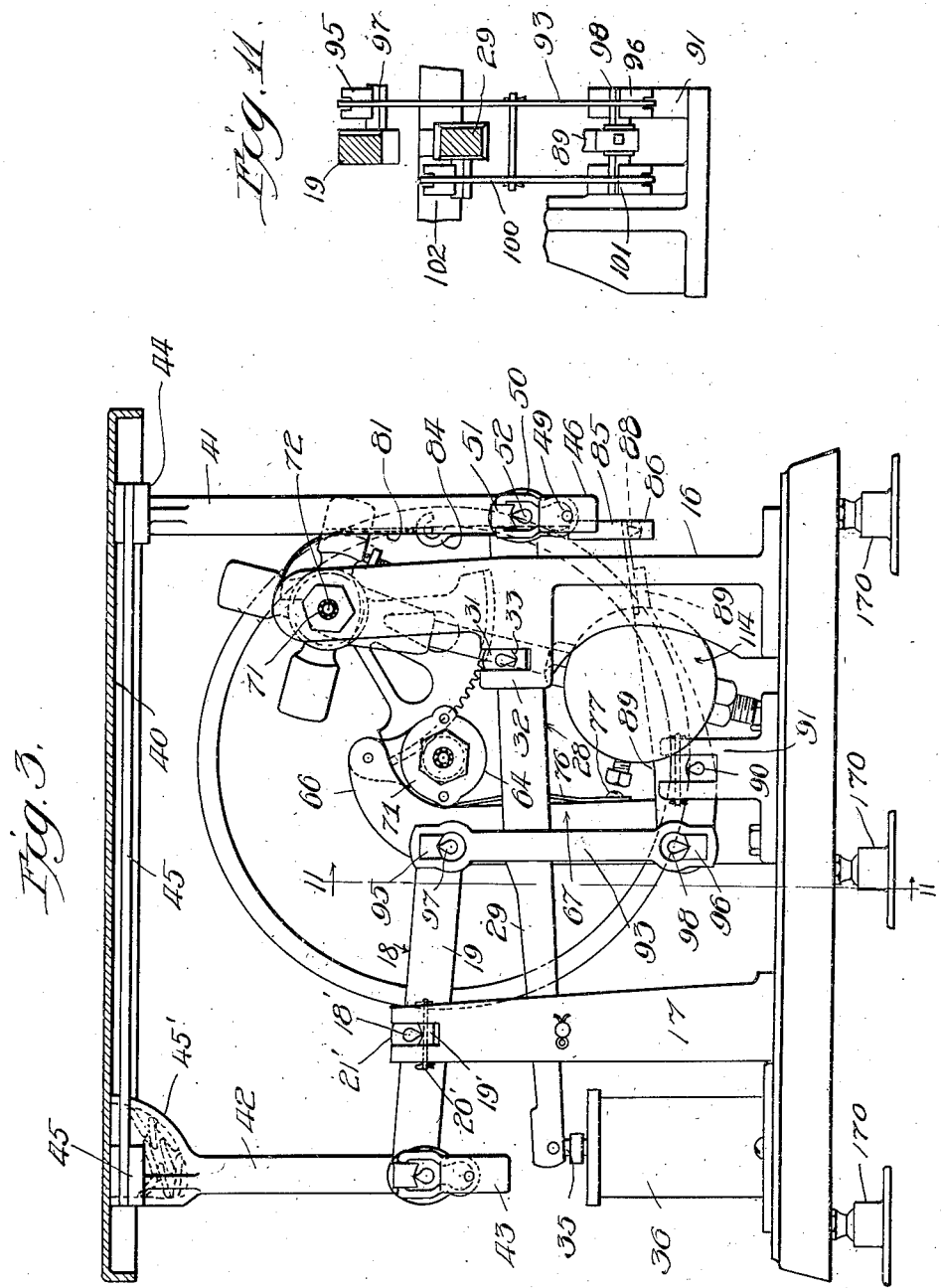

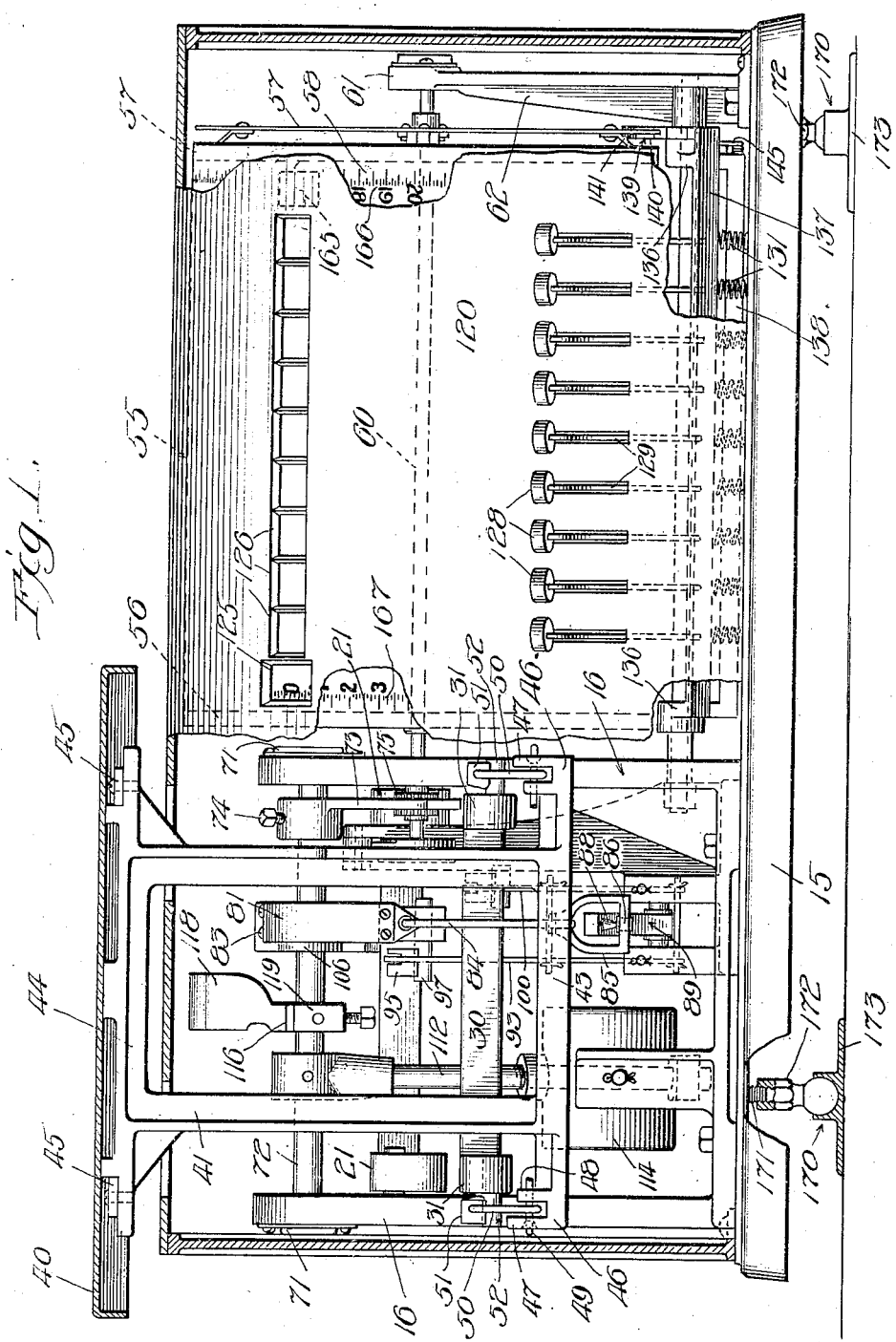

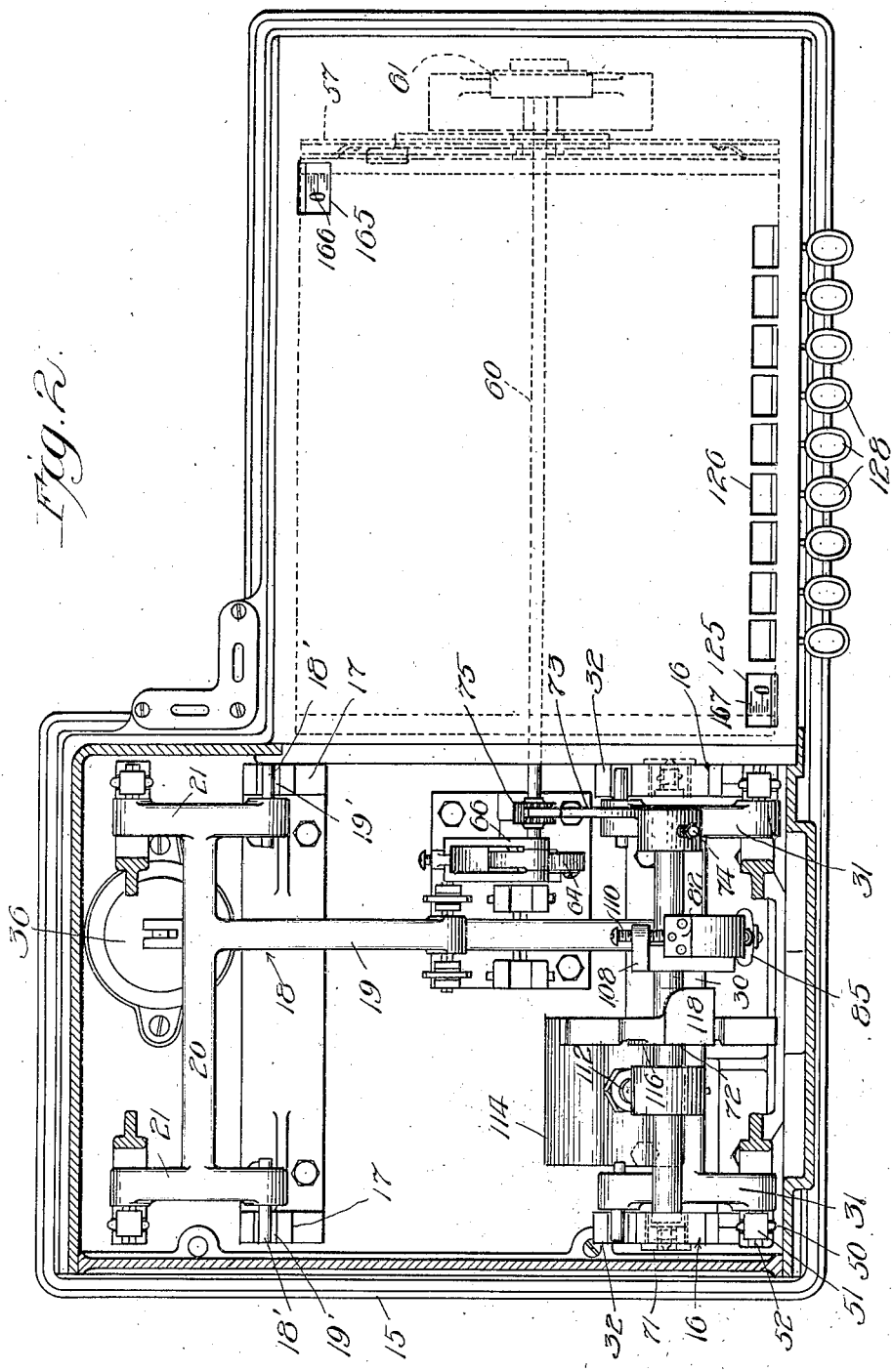

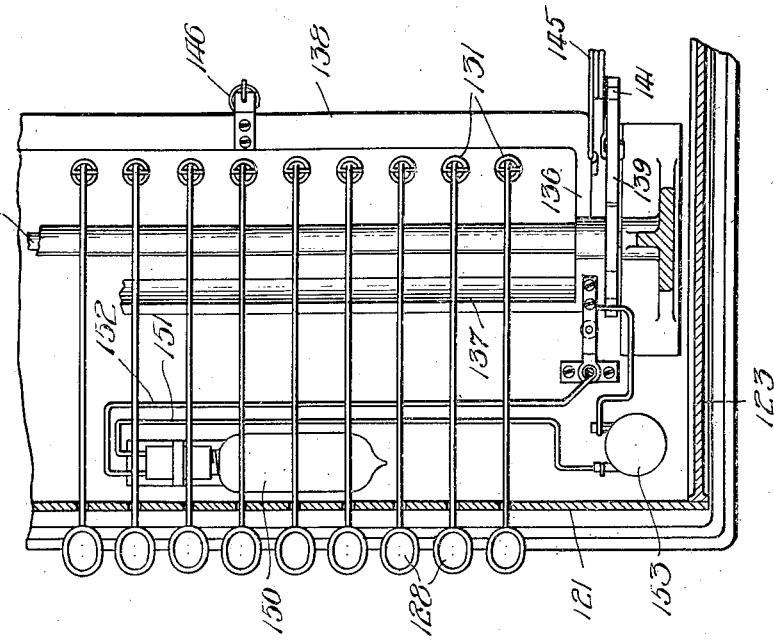

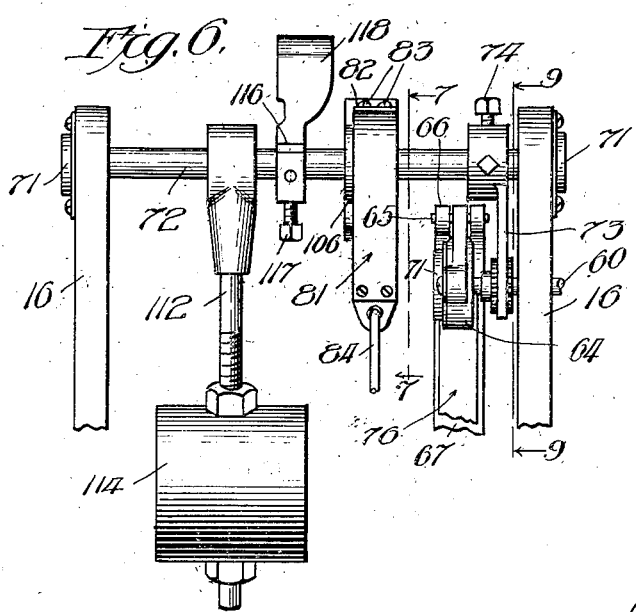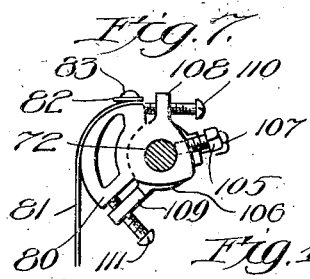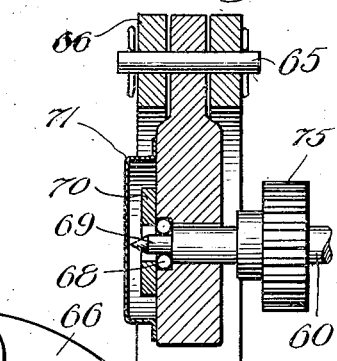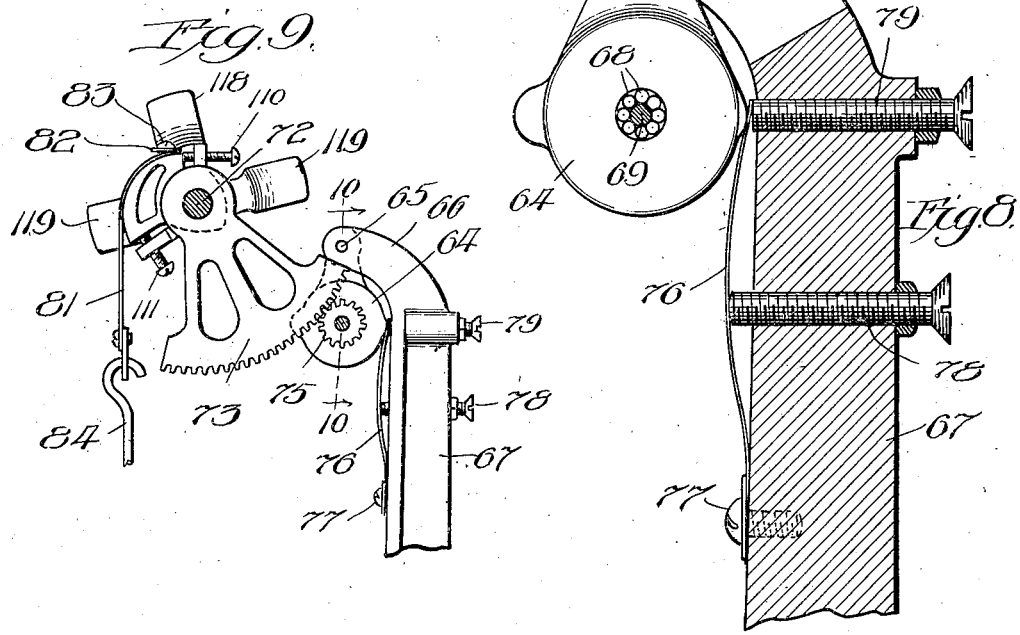

UNITED STATES PATENT OFFICE.

GORDON L. STRUBLER, OF CHICAGO, ILLINOIS, ASSIGNOR OF NINETY-NINE ONE-HUNDREDTHS TO PARCEL POST SCALE CO., OF LOGANSPORT, INDIANA, A CORPORATION OF INDIANA.

PARCEL-POST SCALE.

1,296,710.	Specification of Letters Patent.	Patented Mar. 11, 1919.

Application filed August 11, 1917. Serial No. 185,664.

*To all whom it may concern:*

Be it known that I, GORDON L. STRUBLER, a citizen of the United States, and a resident of Chicago, in the county of Cook and State of Illinois, have invented certain new and useful Improvements in Parcel-Post Scales; and do hereby declare that the following is a full, clear, and exact description thereof, reference being had to the accompanying drawings, and to the characters of reference marked thereon, which form a part of this specification.

This invention relates to improvements in weighing scales, and the invention is herein shown as applied to a drum type of computing scale which has been designed more especially for use as a parcel-post scale for weighing parcel post packages.

Among the objects of the invention is to provide an improved scale mechanism adapted more especially for use in connection with a drum type computing scale in which the mechanism is so constructed as to reduce the elements of friction to a minimum and to eliminate lost motion, to the end of increasing accuracy and diminishing liability of error.

A further object of the invention is to provide a novel means for balancing the weighing elements of the scale in which the weight of the commodity is counterpoised by a pendulum weight, the balancing means being constructed to accurately balance the scale mechanism, with the pendulum weight omitted, so that the pendulum weight operates in opposition to the weight of the commodity, to accurately indicate the weight and price computations.

A further object of the invention is to provide, in combination with a rotative drum type scale and its supporting shaft, means to loosely or swingingly mount one end bearing of the shaft so that the pinion carried thereby may be free to adjust itself to a co-acting gear actuated by the weighing mechanism without producing objectionable binding or friction between the gear elements.

A further object of the invention is to provide, in a weighing mechanism of the character described, a novel arrangement of combined eccentric and pendulum shaft mounting for transmitting movement from the weighing mechanism to the drum, due to the weight of the commodity, with means for adjusting the eccentric about the axis of the shaft and for locking the eccentric in adjusted positions.

Another object of the invention is to provide an improved self alining bearing for the various levers of the weighing mechanism, so constructed and arranged as to automatically aline the normally fixed members of the bearings to the rocking members thereof.

A further object of the invention is to provide a novel connection between the load platform supporting frame and the weighing mechanism levers, so constructed and arranged as to permit free flexible or swinging movement of the load platform frame, relatively to said levers and to avoid binding, or friction in said connections.

Another object of the invention is to provide, in connection with a drum type computing scale having a series of windows through which to exhibit a number of rows or columns of computed numerals, with key-operated shutters to separately expose the numerals through said windows, means operating upon the depression of any key for illuminating the data bearing drum chart and the numeral thus exposed through the window.

A further object of the invention is to provide in a drum type computing scale having a series of columns of weight units and a column of computed rate units which are progressively exhibited through appropriate windows at the front of the scale, a second column of weight units on the drum chart in reverse order to the first named column, which units of said second column are progressively exhibited through a window at the back of the scale.

Another object of the invention is to provide, in combination with a drum type parcel post computing scale having zone key operating means to lock the drum at a given integral unit, determined by the weight, constructed to advance the drum when the weight indicated is a fraction of a predetermined integral unit to the next higher integral unit, means to prevent the advancement of the drum when the load indicates a fractional part of the initial integral unit.

Other objects of the invention are to improve, simplify and increase the accuracy of weighing scales, and the invention consists in the combination and arrangement of the parts shown in the drawings and described in the specification, and is pointed out in the appended claims.

In the drawings:—

Figure 1 is a front elevation, with parts broken away, of a scale embodying my invention.

Fig. 2 is a plan view with the platform supports shown in horizontal section.

Fig. 3 is a left hand end elevation thereof.

Fig. 4 is a right hand end elevation of the scale with the end casing wall omitted.

Fig. 5 is a fragmentary plan view of the key mechanism for operating the shutters and for controlling the final weight indicating position of the chart.

Fig. 6 is a detail view, illustrating the balanced combined eccentric and pendulum weight carrying shaft.

Fig. 7 is a detail section on the line 7—7 of Fig. 6.

Fig. 8 is an enlarged view of the bearing for one end of the drum shaft and the parts supporting the same.

Fig. 9 is a vertical section on the line 9—9 of Fig. 6.

Fig. 10 is a fragmentary section on the line 10—10 of Fig. 9.

Fig. 11 is a vertical section on the line 11—11 of Fig. 3.

As shown in the drawings 15 designates the base of the scale upon one end of which are mounted front and rear stands 16, 17 each consisting of two upright arms.

18 designates a short lever of the first class, consisting of a longitudinal member 19 and a transverse member 20 on the ends of which latter are formed cross fulcrum arms 21. The forward ends of the fulcrum arms are supported on the rear stand 17 through the medium of self alining bearings, comprising knife edge bearing members 18' that are seated in V-shape fulcrum blocks 19' suitably supported in upwardly open notches of the stand. The self alining feature of the bearings consists in pivoting said fulcrum blocks 19' on horizontal pins 20' that are transverse to the axes of the knife edge bearing members 18' so that the knife edges of the bearings automatically find their seats in the V-shape fulcrum blocks.

28 designates as a whole a longer lever of the first class located below the lever 18, as shown. It has an arm 29 which extends from front to rear of the frame and is provided near its forward end with a transverse member 30 (Figs. 1 and 2), having at its opposite ends cross fulcrum arms 31, 31. Said cross arms 31 are fulcrumed at their rear ends in upwardly notched portions of rearward extensions 32 of the front stand 16 through the medium of self alining bearings, designated as a whole by 33 (Fig. 3), like the self alining bearings previously described. The rear end of the longer arm 29 of the lever 28 is loosely or pivotally connected to the plunger 35 of a dash pot 36 which is supported on the rear side of the base 20.

40 designates a load platform or commodity support which is supported on the upper ends of front and rear pairs of legs 41, 42 respectively, the lower ends of the legs of each pair being connected by cross members 43. The legs of each pair are also connected at their upper ends by front and rear cross members 44 and the front and rear cross members 44 are connected by longitudinal tie-bars 45; the whole constituting a vertically movable platform carrying frame. The said frame is loosely or swingingly connected to the front and rear ends of the respective cross arms 31 and 21 of the levers 28 and 18, said loose or swinging connection being such as to permit the supporting legs of the platform frame to move vertically and transmit the load thereof to the swinging levers without tendency of the parts to bind due to the direct and arcuate movements of the respective parts.

The loose or swinging connection between the platform frame legs 41, 42 and said levers consists in providing the transverse members 43 with end extensions 46 each of which is formed with a yoke consisting of upwardly extending arms 47, 48; and said yokes carry horizontal pins 49 which extend through the lower ends of links 50, the upper ends of which are loosely connected to V-shape fulcrum blocks 51 that rests on knife edge bearings 52 which are fixed to and extend laterally from the front and rear cross arms 31 and 21 of the levers 28 and 18, respectively. The outer arms 47 of the yokes extend some distance higher than the inner arms 48 so as to prevent detachment of the fulcrum blocks 51 from the bearings 52 in the event of lateral shifting of said blocks due to side sway of the load platform frame.

55 designates a data bearing chart drum which comprises ring-like end members or heads 56, 57 and a thin cylindric chart 58, preferably made of paper or like light material which is supported on and extends between the ring-like end members. Said ring-like members or heads of the drum are supported by a central shaft 60, one end of which is mounted in a suitable fixed bearing 61 carried by the upper end of a standard 62 that is supported on and rises from the base 15. The other end of the shaft is rotatively mounted in a bearing member 64 (Figs. 3, 8, 9, and 10) which is swingingly supported on a short pin or shaft 65 that being mounted in the slotted, overhanging upper end 66 of a standard 67 that is supported on and rises from the base a distance beyond the inner end of the drum. The swinging member 64 permits the inner end of the drum shaft 60 to swing toward and from the standard 67, for a purpose hereinafter to be described, the bearing 61 for the outer end of the drum shaft being sufficiently loose or flexible to permit slight swinging movement of the shaft in said outer bearing. The said shaft 60 is mounted at its outer and inner ends in ball bearings 68 carried by the bearing members 61 and 64 (the detail of the ball or anti-friction bearing being shown at the inner end of the shaft in Figs. 8 and 10). Said detail consists in loosely extending the shaft 60 through openings in its bearing members 61, 64 and providing the ends of the shaft with reduced extensions 69 which extends through enlarged annular ball races in the bearing members in such manner that the shaft is supported in said bearing members through the interposition of the anti-friction balls 68. Said anti-friction balls are held in said races by means of plates 70 applied over the faces of the bearing members and partially overlapping said anti-friction balls, and provided with central openings through which the reduced ends of the shaft extend, as best shown in Fig. 10. Dust caps 71 applied over said plates and are attached to the bearing members by screws or other suitable means to prevent access of dust to the bearings. This detail of anti-friction bearing is repeated in other parts of the scale, as will hereinafter appear, and such bearings will be hereinafter designated as a whole by the numeral 71.

72 designates a horizontal shaft that is rotatively mounted on the upper ends of the arms of the front stand 16, preferably through the medium of anti-friction bearings 71 like those before described. 73 designates a gear sector which is fixed to the inner end of said shaft in any suitable manner, as by means of the set screws 74 (Figs. 1 and 6). Said sector is located near the drum end of said shaft and meshes with a pinion 75 that is fixed to the drum shaft 60. In order that the pinion 75 may be held in constant mesh with the gear sector 73, and without tendency to effect a binding or friction action between the meshing gear elements, the swinging bearing 64 for the inner end of the drum shaft 60 is backed by a suitable spring device, affording a light pressure to press the bearing toward the gear sector 73. The form of spring device employed is best shown in Figs. 8 and 9, wherein 76 designates a flat or leaf spring that is attached at one end to the standard 67, as by a screw 77, and abutment adjusting screws 78, 79, respectively, are threaded through said standard and bear, respectively, at a point intermediate the ends of the spring and at the upper or free end of said spring. The adjusting screw 78 permits the pressure exerted by the spring to be varied. The abutment screw 79 prevents sudden vibration of the weighing mechanism from demeshing the sector and pinion and thereby deranging the relation of the weighing mechanism relatively to the chart.

80 designates an eccentric that is mounted on and is adjustably fixed to said shaft 72 by means hereinafter described, its periphery being eccentric to the axis of said shaft.

81 designates a strap that is applied over the periphery of said eccentric and is attached at its upper end to the eccentric in any suitable manner, as by means of a clamping plate 82 and screws 83. The other or lower end of the strap 81 is connected to the upper end of a link 84. The lower end of said link carries a stirrup 85 in which is mounted a socket 86 (Figs. 1 and 3) and said socket 86 is engaged by a point bearing 88 that is fixed to the forward end of a lever 89 of the first class. Said lever 89 is fulcrumed at 90, preferably by means of self-alining fulcrums corresponding to the members 25, 26 before described, to a two part fulcrum stand 91 that is supported on and rises from the base 15.

The rear or shorter arm of said lever 89 is connected by a link 93 to the forward end of the lever 18 by means of upper and lower V-fulcrum blocks 95, 96, respectively (Fig. 3) carried by said link and co-acting knife edge bearings 97. 98 which extend laterally from the levers 18 and 89, respectively. The said rear or shorter arm of the lever 89 is also connected by a link 100 with the lever 28, between the ends of the latter, through the medium of like V-fulcrum blocks and knife edge bearings designated as a whole, respectively, by 101, 102, and best shown in Fig. 11.

The eccentric 80 is adjustably mounted on the shaft 72 so as to be angularly adjusted about the axis of the shaft and is adapted to be locked in adjusted positions. To this end the said eccentric is fitted loosely on said shaft and may be locked thereon by means of a set screw 105. The means for angularly adjusting the eccentric on the shaft 72 consists of a block 106 that is locked to the shaft, as by means of a set screw 107, and said block is provided with angularly spaced arms 108, 109. Through said arms are threaded adjusting screws 110, 111 which bear upon rearwardly directed parts of the eccentric 80 at opposite sides (the upper and lower sides as herein shown) of the axis of said shaft. The eccentric is adjusted on the shaft by first releasing its locking screw 105, and thereafter turning the adjusting screws 110, 111 in the proper directions, backing one of said screws off while turning the other screw toward said eccentric; and when the correct adjustment is effected the set screw 105 is turned against the shaft to lock the eccentric in place.

Depending from the shaft 72 and connected thereto by a stem 112 is a pendulum weight 114; said pendulum weight being adjustable along the length of the stem by means of nuts threaded to the stem above and below the counterweight, and the threaded portion of the stem extending loosely through an opening in the pendulum weight. The function of said pendulum weight is to counterbalance the weight of the load on the platform or commodity support 40.

In order to accurately balance the shaft 72, the eccentric 80 and gear sector 73 carried thereby in all angular positions of the said shaft and parts, and to thereby insure accuracy of operation of the weighing mechanism, said shaft carries a balancing weight which consists of a hub portion 116 that is mounted on the shaft 72 and is locked thereto in any suitable manner, as by the set screws 117, and radial arms 118, 119, 119; the former arm extending upwardly from the shaft in the zero position of the scale and the arms 119 extending oppositely from each other and at substantially right angles to the arm 118. The said arms are so weighted as to counterbalance the shaft and the parts mounted thereon in all angular positions, of the shaft, when the pendulum weight and its stem are disconnected from said shaft. Therefore, when the parts are so balanced and the pendulum weight is attached to the shaft, the load acts directly against the pendulum weight through said shaft without modification or overbalancing tendency due to varying lever arms of the eccentric and gear sector in the turning movement of the shaft. Preferably the rear member 45 of the load carrying frame is formed to provide a short pocket 45′ which is adapted to be filled with suitable weight to assist in balancing the scale.

The data bearing drum chart is inclosed by a suitable casing consisting, as herein shown, of a front member 120, a combined rear and top member 121, 122 (Fig. 4), and an end member 123 (Fig. 5). For sake of clearness of illustration said casing has been partially or wholly omitted from certain of the figures.

The parcel post scale herein shown is of that general type wherein the data bearing drum chart bears a column or row of weight numerals which are progressively displayed as the drum is rotated by the load through an opening or window 125 in the front member of the casing, and in addition thereto a series of rows or columns of rate numerals, each column appropriated to a given parcel-post zone; and said rate columns are located severally behind other windows 126, which windows are normally closed by movable shutters 127 that lie between the front casing wall and chart. Said shutters are placed under the control of suitable keys 128, whose levers 129 extend through slots in the front casing wall and are pivoted to a transverse horizontal shaft 130 beneath the drum bearing shaft 60 that is mounted at one end in the drum shaft standard 62 and at its other end in a bearing carried by the standard 67. The keys are normally held in their elevated positions by spiral springs 131 connecting the rear ends of the key levers to the base.

The drum is additionally placed under the influence or control of means, operated by the depression of the keys, for positively shifting the drum forwardly, independent of its movement under the influence of the weight of the load, so as to display through the window, whose shutter has been removed by the depression of the key, a maximum rate or integral unit numeral to correspond with the weight numeral; it being understood that in accordance with the postal regulations no account is taken of fractional parts of a pound above a certain initial fractional weight below a pound, and the positive step-up movement of the drum to effect the reading of the proper integral rate unit insures that the rate reading, when the weight indicated is a fraction of a pound or other weight unit, shall always be the next higher integral unit. This control is also constructed in such a way as to positively lock the drum in position to exhibit the proper rate and weight units. The means herein shown whereby this positive control of the data bearing drum chart is effected is made as follows:

The outer end ring or head 57 of the chart is provided with a series of ratchet teeth 135, each having one curved face generally radial to the turning axis of the drum and another face that is oblique to the radius of the drum. Mounted on the key lever fulcrum shaft 130 is a rocking frame comprising end bearing members 136 136, pivoted to said shaft, a universal bar 137 that lies beneath the key levers in front of said fulcrum shaft 130, and a connecting bar 138 in rear of said shaft.

139 designates a pawl that is pivoted to the fulcrum shaft 130 and carries at its rear end an upwardly directed tooth 140 which is adapted for engagement with the ratchet teeth 135 of the outer drum ring or head 57. Said pawl tooth is formed with an oblique face 141 which intersects the rear straight face of the tooth to produce a sharp engaging salient.

The front end or heel of said pawl is formed with a beveled or oblique bearing face 142 which engage a correspondingly beveled surface 143 on the universal bar rocking frame in front of the shaft 130. The rear end of the pawl is placed under the influence of a spring 145 which is coiled between its ends, and one end of which is attached to the rocking universal bar frame and the other end of which bears upwardly against the rear end of said pawl. Said spring 145 serves to normally hold the pawl in such position that the oblique bearing face 142 at the heel thereof is held against the corresponding oblique face of the universal bar rocking frame, and said spring also acts as a yielding connection between the rear side member 138 of said rocking frame and said pawl to throw the dog upwardly against the ratchet teeth 135 when any one of the keys is depressed; each key acting through the universal bar and through said spring to thus raise the rear end of said pawl or dog. The universal bar rocking frame is held in its normal position, with said universal bar beneath and in close contact with each of the key levers, by means of a spring 146 that is connected between the base 15 and the rear connecting bar 138 of said universal bar rocking frame.

By reason of the contour of the ratchet teeth 135 and of the tooth 140 of the pawl or dog 139, it will be observed that, unless the drum be accurately in position for the pawl tooth to enter directly to the bottom of the inter-space between two ratchet teeth, the engagement of the beveled or oblique face 141 of the pawl tooth with the rearwardly beveled face of the adjacent ratchet tooth serves to draw the engaged ratchet tooth forwardly and thereby advance the chart drum. It will be understood that the number of the ratchet teeth 135 of the drum ring 57 corresponds with the number of integral units, such as pounds, in the weight unit column that are exhibited through the window 125. Therefore, if the load, due to the weight on the platform 40, indicates a fraction between two integral weight units the effect of the dog on the ratchet will be to advance the drum to the next higher integral weight unit, and, as will be observed, will also effect a positive locking of the drum so long as the key is depressed.

In accordance with the postal regulations, parcel post packages of four ounces or less bear the same postage rate throughout all of the zones. In order that such lighter packages may be rated accurately on the scale, means are provided whereby the positive advancement of the drum, under the action of the zone keys, is not effected on indicated weights of four ounces or less. This release of control of the drum from the pawl 139 is herein shown as effected by cutting off or blunting that one of the ratchet teeth 135′ which, in the zero position of the scale, lies next adjacent to and slightly in advance of the salient of the pawl tooth. With this construction, the lighter weight parcel whose rate is common to all the zones will advance the blunt tooth in position so that it will be struck by the salient of the pawl tooth when it is raised by the depression of any one of the zone keys and the engagement of the pawl tooth with the blunt ratchet tooth will arrest the rising movement of the pawl. By reason of the spring connection between the rocking universal bar frame, however, and said dog, the key and universal bar frame may be further depressed relatively to the pawl to displace the proper door or shutter from the window through which the particular zone rate is to be displayed. However, when the weight is beyond the common zone rate, the oblique face of the pawl tooth will engage the oblique face of the blunt or cut away tooth and positively advance the drum chart to exhibit the next higher integral weight and rate numerals.

In order that the weight data or numerals of the drum exposed through the windows may be accurately read when the scale is in a dark position, I may employ an illuminating electric lamp 150 that is located just in rear of the front wall 120 of the casing at the base. The lead wires 151, 152 of said lamp are connected, the first with a terminal plug 153, supported on the base, and the other 152 through a suitable switch mechanism with said plug, the connection being such that the lamp circuit is closed on depression of any of the key levers 129 so as to illuminate the drum when a shutter is shifted away from a sight opening or window. Said lead wire 152 is shown as connected to a metal post 155 which is supported on and is insulated from the base and is provided with an arm 156 through which is threaded an upright screw 157, the upper end of which carries a platinum terminal 158. 160 designates a wire which is connected at one end to the plug 153 and at its other end to a metal plate or strip 161 that is attached to and is insulated from the universal bar beneath the key levers 129. The said plate 161 carries a platinum terminal 162 which, when the universal bar is depressed by the depression of one of the keys 129, contacts with the terminal 158 to close the circuit through the lamp and thereby illuminate the data bearing drum. The threaded connection of the screw 157 with the arm 156 enables the width of the gap between the terminal to be regulated to suit the conditions. It will be understood that the plug 153 will be attached to any suitable source of current, or it may be replaced by a battery.

The casing is provided in its rear wall with an opening 165, indicated in dotted lines in Fig. 1, located opposite the outer end of the drum and the drum is provided at its outer end with a row 166 of weight numerals or units, corresponding to the row 167 at the inner end of the drum, and which latter are progressively exhibited through the window 125. The numerals of the row 166, however, are arranged in reverse order to the numerals in row 167 and are adapted to be progressively exhibited through the window 165 in such a way that a person standing in front of the scale may observe the weight of the package being weighed.

The base is supported on three feet 170, arranged in tripod order, each foot consists of a screw stud 171 (Fig. 1) which depends from the base, a sleeve 172 of hexagonal or other polygonal contour into which the stud is threaded and a base 173 to which the sleeve is swiveled, as by a ball and socket joint. The construction of the feet is such that they may be adjusted to length to level the scale, and the flat swiveled bases of the feet assures stable footing even though the supporting surface be not entirely smooth or level.

It will be understood that the structural details, and their relation to specifically functioning scale mechanism may be varied within the spirit and scope of the invention, and that the invention is not limited to the within described details or functions except as to claims primarily limited thereto, or as imposed by the art. For instance, the weight indicating element, herein shown, as a drum chart, may be either a chart or an indicating element movable over a chart.

I claim as my invention:—

1. In a scale, a stand, a scale lever fulcrumed on the stand, a weight indicating element provided with a pinion, a shaft rotatively mounted in the stand and provided with a gear sector meshing with said pinion, an eccentric mounted on said shaft, a strap for connecting the eccentric to said lever, a load counterpoise pendulum suspended from said shaft, and a multiple arm balancing weight carried with the shaft for balancing said gear sector and eccentric independently of the pendulum, in all angular positions of the shaft.

2. In a scale, a fulcrum stand, a scale lever fulcrumed thereon, a weight indicating element provided with a pinion, a shaft rotatively mounted in the stand, a gear sector fixed to said shaft and meshing with said pinion and located principally at one side of said shaft, an eccentric mounted on the shaft and located principally on the other side of said shaft, a flexible connection between said eccentric and scale lever, and a balancing member carried by the shaft having two arms located, one at the sector side of the shaft and the other at the eccentric side thereof, and provided with a third upright arm.

3. In a scale for the purpose set forth, a rotative shaft operatively connected between the weighing mechanism and the weight indicating element, and provided at one side with a gear sector to control said weight indicating element and at its other side with a compensating eccentric, operatively connected to the weighing mechanism, and a multiple arm balancing member on said shaft to balance said gear sector and eccentric in all angular positions of the shaft.

4. In a scale, a fulcrum stand, a scale lever fulcrumed thereon, a weight indicating element provided with a pinion, a shaft rotatively mounted on the stand, a gear sector fixed to said shaft and meshing with said pinion and located principally at one side of said shaft, an eccentric mounted on the shaft and located principally on the other side of said shaft, a flexible connection between said eccentric and scale lever, and a balancing member carried by the shaft having two arms located, one at the sector side of the shaft and the other at the eccentric side thereof, and provided with a third upright arm, and a load counterpoise pendulum suspended from said shaft, the parts being so arranged that the shaft eccentric and gear sector are balanced by said balancing member in all angular positions of the shaft independently of the said pendulum.

5. In a scale, a weighing mechanism, a weight indicating element having a rotative shaft provided with a pinion, a fixed bearing for one end of said shaft, a movable bearing for the pinion end of the shaft, and an operative connection between the scale lever and said latter end of the shaft, embracing a gear operatively connected to the weighing mechanism and meshing with said pinion.

6. In a scale, a weighing mechanism, a weight indicating element having a rotative shaft provided with a pinion, a fixed bearing for one end of said shaft, a movable bearing for the pinion end of the shaft, and an operative connection between the scale lever and said latter end of the shaft, embracing a gear operatively connected to the weighing mechanism and meshing with said pinion, with means whereby said movable bearing is controlled to maintain the pinion and gear in mesh.

7. In a scale, a fulcrum stand, a scale lever fulcrumed thereon, a weight indicating element, a shaft therefor provided with a pinion, a fixed bearing in which one end of the shaft is rotatively mounted, a swinging bearing carrying the other or pinion end of the shaft, a shaft rotatively mounted in the stand and operatively connected to the scale lever, a gear on said shaft meshing with said pinion, load counterpoise means carried by said fulcrum stand shaft, and a spring applied to said bearing to maintain the said gear and said pinion in mesh.

8. In a scale, a weighing mechanism, a weight indicating element, a supporting shaft therefor provided with a pinion, a fixed bearing for one end of said shaft, a swinging bearing for the other or pinion end of said shaft, a gear operatively connected to the weighing mechanism and meshing with said pinion and a spring applied to said swinging bearing to maintain the gear and pinion yieldingly in mesh.

9. In a scale, a weighing mechanism, a weight indicating element, a shaft on which said element is mounted and provided with a pinion, a fixed bearing for one end of said shaft, a shiftable bearing for the other end of said shaft, a gear operatively connected to the weighing mechanism and meshing with said pinion, and adjustable means acting on said pinion to maintain it in mesh with said gear.

10. In a scale, a fulcrum stand, a scale lever fulcrumed thereon, a weight indicating element, a supporting shaft therefor having a pinion, a fixed bearing in which one end of the shaft is rotatively mounted, a standard having an overhanging upper end, a swinging bearing carried by said overhanging end of the standard in which the other end of said shaft is rotatively mounted, a gear sector meshing with said pinion, operative connections between said gear sector and said scale lever and a spring carried by said standard and pressing against the swinging bearing to maintain the pinion and gear sector in mesh.

11. In a scale, a fulcrum stand, a scale lever fulcrumed thereon, a weight indicating element, a shaft thereof provided with a pinion, a fixed bearing in which one end of the shaft is rotatively mounted, a standard rising from the base and having an overhanging upper end, a swinging bearing carried by said overhanging end of the standard in which the other end of said shaft is rotatively mounted, a second shaft, a gear sector mounted thereon and meshing with said pinion, operative connections between said gear sector and said scale lever, and a spring carried by said standard and bearing against said swinging bearing.

12. In a scale a fulcrum stand, a scale lever fulcrumed thereon, a weight indicating element, a supporting shaft therefor having a pinion, a fixed bearing in which one end of the shaft is rotatively mounted, a standard having an overhanging upper end, a swinging bearing carried by said overhanging end of the standard in which the pinion end of said shaft is rotatively mounted, a gear sector meshing with said pinion, operative connections between said gear sector and said scale lever and a spring carried by said standard and pressing against the swinging bearing to maintain the pinion and gear sector in mesh, with means to regulate the tension of said spring.

13. In a scale, a fulcrum stand, a scale lever fulcrumed thereon, a weight indicating element provided with a shaft, having a pinion, a fixed bearing in which one end of the shaft is rotatively mounted, an upright standard having an overhanging member, a swinging bearing carried by said overhanging member in which the pinion end of said shaft is rotatively mounted, a gear sector meshing with said pinion, with operative connections between said gear sector and said scale lever, a leaf spring attached to said standard and a bearing at one end against the swinging bearing, and a screw threaded through the standard and bearing against said spring intermediate its ends.

14. In a scale for the purpose set forth, the combination with a shaft having at one end a pinion, a swinging bearing for the pinion end of the shaft and a weighing mechanism including a gear sector meshing with said pinion, of a spring to yieldingly urge said pinion and gear sector into meshing engagement.

15. In a scale for the purpose set forth, the combination with a shaft having at one end a pinion, a swinging bearing for the pinion end of the shaft and a weighing mechanism including a gear sector meshing with said pinion, of a leaf spring pressing at one end against said swinging bearing, an adjusting screw bearing on said spring between its ends, and an abutment screw bearing against the free end of said spring.

16. In a scale, a weighing mechanism, a weight indicating element provided with a supporting shaft, having at one end a pinion, a fixed ball bearing in which one end of said shaft is loosely mounted to permit the other end thereof to swing laterally, a swinging bearing member provided with a ball bearing in which the other or pinion end of said shaft is mounted, a gear sector operatively connected to the weighing mechanism and meshing with said pinion and adjustable means acting against said bearing member to yieldingly maintain the pinion and gear sector in meshing engagement.

17. In a scale, a base, a fulcrum stand rising therefrom, upper and lower scale levers fulcrumed on said stand, a load platform bearing frame, hangers loosely connecting said frame with the scale levers, a vibration absorbing device connected to one end of one of said levers, a third lever fulcrumed on the stand and operatively connected with one end of one of said first levers and to the intermediate part of the other lever, a shaft mounted in said stand, flexible connections between said shaft and said third lever, a weight indicating device, operative connections between said device and said shaft and a counterpoise element applied to said shaft.

18. In a scale a base, a fulcrum stand rising therefrom, upper and lower scale levers fulcrumed on said stand, by self-alining fulcrums consisting of rocking V-shape fulcrum blocks and knife edge bearing members, a load platform bearing frame, hangers loosely connecting said frame with the scale levers, a vibration absorbing device connected to one end of one of said levers, a third lever fulcrumed on the stand and operatively connected with one end of one of said first levers and to the intermediate part of the other lever, a shaft mounted in said stand, flexible connections between said shaft and said third lever, a weight indicating device, operative connections between said device and said shaft and a counterpoise element applied to said shaft.

19. In a scale, a fulcrum stand, levers fulcrumed on said stand, a load platform bearing frame, hangers loosely connecting said frame to the levers, a vibration absorbing device connected at one end of one of said levers, a third lever fulcrumed on the stand and operatively connected with the other levers, a shaft mounted on said stand, flexible connections between said shaft and said third lever, a weight indicating device, operative connections between said device and shaft, and a counterpoise element applied to said shaft, the hangers connecting said platform bearing frame to said levers embracing links provided with fulcrum blocks which engage knife edge bearings on said levers, and said frame being formed with guards to prevent lateral separation of the fulcrum blocks from said bearings due to side sway of said frame.

20. In a scale a fulcrum stand, levers fulcrumed on said stand, a load platform bearing frame, hangers loosely connecting said frame to the levers, a vibration absorbing device connected to one of said levers, a third lever fulcrumed on the stand and operatively connected with the other levers, a shaft mounted on said stand, flexible connections between said shaft and said third lever, a weight indicating device, operative connections between said weight indicating device and shaft, and a counterpoise element applied to said shaft, the hangers connecting said platform bearing frame to said levers embracing links provided with fulcrum blocks which engage knife edge bearings on said levers, said frame being provided with pairs of guards, pins extending through said guard and said links, the outer guards of each pair being elongated to prevent detachment of the fulcrum blocks from the knife edge bearings.

21. In a scale of the character set forth, the combination with a platform bearing frame provided with yoke arms and a fulcrumed scale lever provided with knife edge bearings, of a hanger for connecting said frame to the lever, embracing a pin extending through said yoke arms, a link through which said pin extends and a fulcrum block carried by said link and engaging said knife edge bearing, one of said arms being elongated to prevent disengagement of the fulcrum block and the knife edge bearing due to side swaying or lateral movement of said frame.

22. In a scale a fulcrum stand, levers fulcrumed on said stand, a load platform bearing frame, hangers loosely connecting said frame to the levers, a vibration absorbing device connected at one end of one of said levers, a third lever fulcrumed on the stand and operatively connected with the other levers, a shaft mounted on said stand, flexible connections between said shaft and said third lever, a weight indicating device, operative connections between said device and shaft, a counterpoise element applied to said shaft, and a shot cup integral with and carried by said frame.

23. A scale comprising a casing formed with a sight opening, a data bearing chart arranged to progressively exhibit the data thereon through said sight opening, a support for the chart, weight actuated means to control the chart, and manually operable means for positively shifting the chart forwardly to insure proper registry of the appropriate data through said opening to the exclusion of other data, said means including means to render inactive said means for so shifting said chart when it is in position to indicate a fraction only of the initial integral weight data.

24. A scale comprising a casing formed with a sight opening, a data bearing chart arranged to progressively exhibit the data through said opening with means to support said chart, and weight actuated means to control it, said chart being provided with an annular ratchet member having a plurality of teeth, and manually operable means embracing a swinging pawl having an obliquely faced salient to engage said ratchet teeth, and coöperative relation between said salient and one of said ratchet teeth to render said shifting means inactive.

25. A scale comprising a casing formed with a sight opening, a data bearing chart arranged to progressively exhibit the data through said opening, a support for the chart, weight actuated controlling means for the chart, said chart being provided with an annular ratchet member having a plurality of teeth, and manually operable means embracing a swinging pawl having an obliquely faced salient to engage said ratchet teeth, one of the ratchet teeth, appropriated to the initial integral weight data, being provided with an abrupt face normal to the plane of movement of said salient.

26. A scale comprising a casing formed with sight openings, a data bearing chart having a plurality of rows of weight and rate units, which are progressively exhibited through their appropriate sight openings, a support for the chart, weight influenced means to control the chart, shutters to normally close said openings, keys connected to and controlling said shutters, said chart being provided with an annular ratchet member whose teeth are severally formed with one oblique face, a dog having an obliquely faced salient adapted to engage said ratchet teeth, and means for operatively connecting the dog with said keys, one of the ratchet teeth, appropriated to the initial weight unit being cut away at its end to provide a straight face disposed at a right angle to the path of movement of said salient.

27. A scale comprising a casing formed with sight openings, a data bearing chart having a plurality of rows of weight and rate units which are progressively exhibited through their appropriate sight openings, a support for said chart, weight actuated means to control said chart, shutters to normally close said openings, keys connected to and controlling said shutters, said chart being provided with an annular ratchet member whose teeth are severally formed with an oblique face, a universal bar frame lying transversely beneath and oscillated by said keys and a swinging dog connected to said frame and having a salient adapted to engage said ratchet teeth, one of the ratchet teeth, appropriated to the initial weight unit, being cut away at its point to provide a straight face disposed at a right angle to the path of movement of said salient.

28. A scale comprising a casing formed with sight openings, a data bearing chart having a plurality of rows of weight and rate units which are progressively exhibited through their appropriate sight openings, a support for said chart, weight actuated means to control said chart, shutters to normally close said openings, keys connected to and controlling said shutters, said chart being provided with an annular ratchet member whose teeth are severally formed with an oblique face, a universal bar frame lying transversely beneath and oscillated by said keys, a swinging dog pivoted on the axis of oscillation of said frame and having at one end a bearing to engage a bearing on said frame, and with a resilient connection between the other end of said dog and said frame, and operative connections between one end of said dog at one of said ratchet teeth to render inactive said chart shifting means when the chart is in position to indicate a fraction only of the initial integral weight data.

29. In a parcel post computing zone scale, a data bearing chart provided with a row of weight numerals and with a plurality of rows of rate numerals, a scale mechanism operatively connected to said chart, and a casing for the chart provided at one side with a plurality of sight openings, severally appropriated to the weight and rate numeral rows, said chart being provided with a second row of weight numerals arranged oppositely to the first row of weight numerals and the casing being provided on the opposite side thereof with a sight opening, through which the weight numerals of the second row are progressively displayed.

30. A parcel post computing zone scale comprising a data bearing chart provided with two rows of weight numerals one arranged in numerically opposite order to the other, and provided also with a plurality of rows of rate numerals, weighing mechanism connected to said chart, a casing inclosing the chart and provided at one side with a plurality of sight openings, through which the weight numerals of one of the rows and the rate numerals are displayed, said casing being provided at its opposite side with a single sight opening through which the weight numerals of the other row are displayed, shutters for normally closing the rate numeral sight openings, keys connected to and controlling said shutters, an electric lamp within the casing for illuminating the chart and a circuit for said lamp having means connected to and controlled by said keys to close the circuit.

31. A parcel post computing zone scale comprising a data bearing chart provided with a row of weight numerals extending in one direction and with a like row of reversely arranged weight numerals, and provided also with a plurality of rows of rate numerals, a weighing mechanism operatively connected to said chart, a casing inclosing the chart, provided at one side with a plurality of sight openings, through which one of the rows of weight numerals and the rows of rate numerals are exhibited, and provided at its other side with a single sight opening through which the other row of weight numerals are exhibited, shutters for normally closing the rate numeral sight openings, manually operable means for controlling said shutters, and means connected to and operated by said manual means for positively advancing the chart, independently of the action of the scale mechanism to secure proper registry of the rate numerals with said sight openings.

32. A computing parcel post zone scale comprising a cylindric data bearing chart, a weighing mechanism operatively connected thereto, a casing provided with a plurality of sight openings through which the different data is separately exhibited, shutters to normally close said openings, a plurality of keys severally connected to said shutters, an electric lamp within said casing for illuminating the chart, a circuit for said lamp, with means operated by the keys to close it, and means controlled by the depression of each key for advancing the chart from a position indicating a fractional weight numeral to a next higher integral weight numeral.

33. A computing parcel post scale comprising a data bearing chart, a weighing mechanism operatively connected thereto, a casing inclosing the same, an electric lamp within the casing for illuminating the chart, manual means to close the circuit of said lamp and means connected to and operated by said manual means for advancing the chart from a position indicating a fractional weight numeral to the next higher integral weight numeral.

34. A parcel post computing zone scale comprising a cylindric data bearing chart, a weighing mechanism operatively connected thereto, a casing inclosing the chart and provided with a plurality of sight openings through which the data numerals of the chart are progressively exhibited, shutters for normally closing said openings, manually operable means for shifting said shutters, and means controlled by the manually operable means for shifting the data bearing chart forwardly to insure registry of the proper data thereon with the appropriate sight openings to the exclusion of other data, said means embracing means to prevent shifting of the chart forwardly when the chart is in position to indicate a fraction of the initial integral weight numeral.

In witness weherof I claim the foregoing as my invention, I hereunto append my signature in the presence of two witnesses at Logansport, Indiana, this seventh day of August, 1917.

GORDON L. STRUBLER.

Witnesses:
F. B. WILLDENSON,
JESSIE WALTER.